BALANCED MIXERS WHICH UTILIZES IMAGE-FREQUENCY POWER REFLECTED FROM DETECTOR DIODES

Filed Oct. 1, 1953

INVENTORS
WILBUR L. PRITCHARD
CARLO P. DOMENICHINI
BY Elmer J. Gorn
ATTORNEY 2,834,876

BALANCED MIXERS WHICH UTILIZE IMAGE-FREQUENCY POWER REFLECTED FROM DETECTOR DIODES

Wilbur L. Pritchard, Watertown, and Carlo P. Domenichini, Lexington, Mass., assignors to Raytheon Manufacturing Company, Newton, Mass., a corporation of Delaware Application October 1, 1953, Serial No. 383,676

1 Claim. (Cl. 250—20)

This invention relates to balanced mixers for mixing microwave energies in wave guides, and more particularly to such mixers utilizing directional couplers.

In balanced mixers of the type in which radio frequency energy at two different frequencies, that of the received energy and that of a local oscillator, is fed through transmission lines to nonlinear impedances, such as crystal rectifiers, in such phase that an output is produced at the desired intermediate frequency, some of the energy at the intermediate frequency meets with energy at one of the two original frequencies to produce energy at a frequency differing from the other original frequency by twice the intermediate frequency. This frequency is known as the image frequency. In the case of balanced mixers, using either a "magic T" or a "rat race" structure for the hybrid, this energy can be eventually reconverted to the desired I. F. frequency and applied to the I. F. amplifier by appropriate narrow band devices in the signal input line.

In one type of balanced mixer, the frequencies to be mixed are propagated in two sections of wave guide coupled by an opening in a common wall toward crystals positioned in transverse planes located, one in each guide, at the same distance from the opening in the common wall between the two guides. Some of the energy present at the crystals is propagated back along the local oscillator guide and absorbed in the resistive attenuator pad usually inserted in this wave guide. The result is a loss of some of the energy that would otherwise appear at the input of the I. F. amplifier as part of the useful signal. This results in a lower conversion gain for mixers using this type of hybrid, as compared to those using either the "magic T" or the ring or "rat race" type of hybrid.

This loss of energy and consequent reduction in conversion gain is avoided in the present invention by positioning the crystal in the oscillator branch further from the opening in the common wall than the crystal mounted in the antenna branch by a distance substantially equal to a quarter wave length at the image frequency. With this arrangement of the crystals, the energy at the image frequency is prevented from propagating back along the oscillator branch, and instead this energy is propagated back along the antenna branch. In this arrangement, proper spacing of the reference plane of the tube transmit-receive cavity or any narrow band filter in the antenna branch causes the cavity to appear as a discontinuity to the reflected energy at the image frequency, and this energy is reflected back to the crystal where it is reconverted to the desired intermediate frequency to recover this energy that would otherwise be lost. Thus, a more compact and cheaper balanced mixer, using the directional coupler hybrid, may be used and still give the same efficiency of conversion as the bulkier and more expensive "magic T" or "rat race" construction.

Other and further advantages of this invention will be apparent as the description thereof progresses, reference being had to the accompanying drawings wherein.

Figure 1:
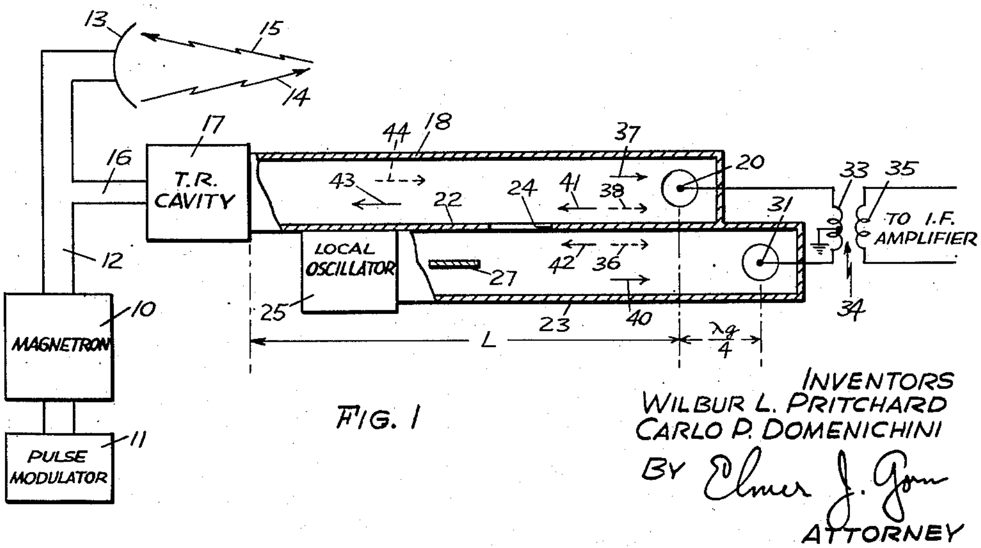
Fig. 1 is a schematic diagram of a radar system utilizing the principle of the invention.

In Fig. 1, a radar set incorporating the invention is shown in which a magnetron 10, or other source of radio frequency energy, is pulse modulated by a pulse modulator 11 to propagate pulse modulated radio frequency energy up a transmission line 12 to an antenna 13 which propagates radio frequency energy outward, as indicated by the arrow 14, until it strikes a target and is reflected back to the antenna, as indicated by the arrow 15. This reflected signal proceeds from the antenna 13 down the transmission line 12 and out along the transmission line 16 to a transmit-receive or T. R. device of any of the well-known types having a cavity 17 resonant at the operating frequency. Energy from the cavity is propagated down a section of wave guide 18 to a nonlinear impedance, such as a silicon crystal 20 mounted in a holder 21. The wave guide 18 has a wall 22 parallel to the electrical vector in common with a wave guide 23. There is an opening 24 in this common wall 22 that permits energy to be coupled between the wave guides 18 and 23. The two guides 18 and 23, and the opening 24, in their common wall constitute a directional coupler type of hybrid junction, more particularly, a directional coupler of the short slot type described and illustrated as "coupler A" in the U. S. Patent No. 2,568,090 to Henry J. Riblet, issued September 18, 1951. A local oscillator 25 propagates energy down the wave guide 23 through a coupling 26, past a resistive pad 27 mounted on a bracket 28 by a screw 30, so that it may be inserted an adjustable amount into the wave guide 23. The local oscillator energy propagates along the guide 23 to a second nonlinear impedance 31, which also may be a silicon crystal mounted in a holder 32. The impedances 20 and 31 are connected one to each end of the primary 33 of a transformer 34, the center tap of which is connected to ground. The secondary 35 of this transformer is coupled to the input to an intermediate frequency amplifier. The crystals 20 and 31 are mounted in transverse planes in their respective guides, 18 and 23, that are separated by a distance equal to substantially a quarter wave length at the image frequency.

Figure 2:
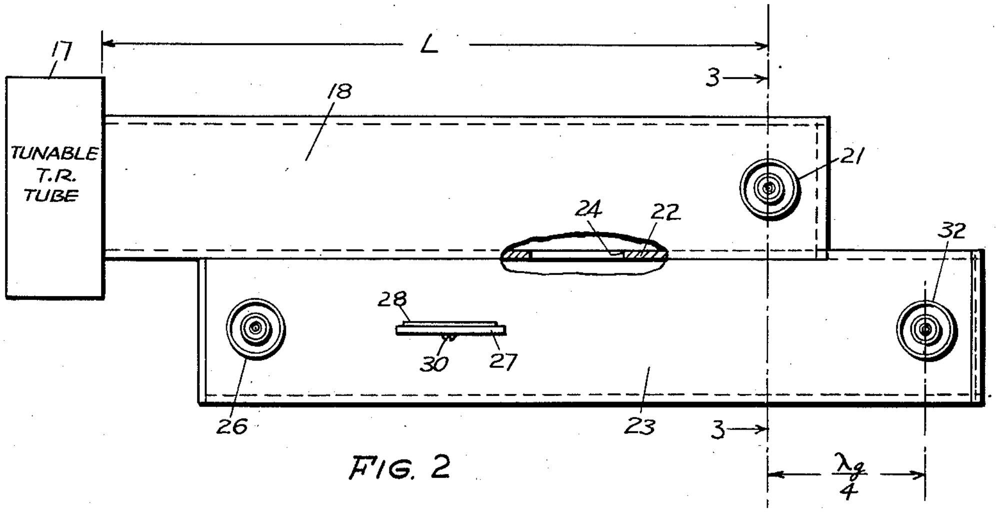
Fig. 2 is a plan view of an embodiment of the balanced mixer of the invention.
Figure 3:
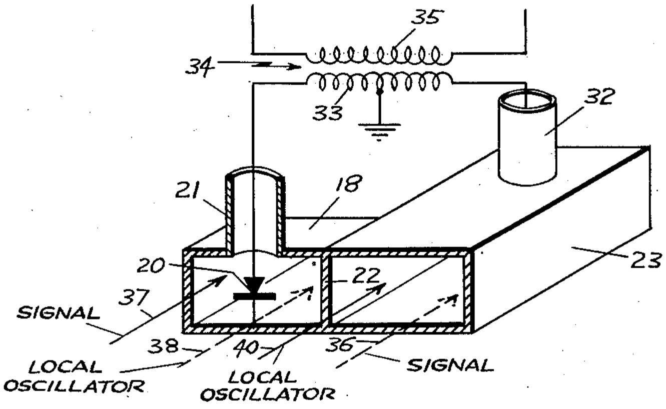
Fig. 3 is a sectional isometric view taken along the line 3—3 of Fig. 2 and a schematic of part of the associated circuit.

In operation, the received energy propagates down the guide 18 from the T. R. cavity to the opening 24 where the energy is coupled through the hole to the local oscillator guide 23, as indicated by the dotted arrow 36 in Fig. 3, and is shifted in phase by ninety electrical degrees, while the other half goes straight through to the crystal 20, as indicated by the solid arrow 37. Energy from the local oscillator 25 is propagated down the guide 23 past the resistive pad 27 where part of this energy is absorbed. The amount of absorption of this energy is dependent upon the depth of insertion of the pad into the guide. Half of the unabsorbed energy is coupled through the hole 24 to the guide 18 after a phase shift of ninety degrees, as indicated by the dotted arrow 38 in Fig. 3. The other half of this energy proceeds on down the guide 23 to the crystal 31, as indicated by the solid arrow 40. In passing through the opening 24, this energy is shifted in phase by ninety degrees in the opposite direction to the shift in the received energy. Energy at these two frequencies combines at each crystal to produce a voltage across the crystal at a frequency equal to the difference in frequencies between local oscillator and signal energy frequencies. For example, if the transmitted and received energy produced by the magnetron 10 has a frequency of 3000 megacycles, and the energy produced by the local oscillator 25 has a frequency of 3030 megacycles, a difference frequency of 30 megacycles is produced in the output of the transformer 34. Part of this 30-megacycle energy beats with the local oscillator energy to produce an image frequency of 3060 megacycles. This energy is propagated back along both guides to the opening 24, as indicated by the arrows 41 and 42. The energies at the image frequency from each crystal combine at the opening 24 and propagate in one guide, or the other, depending on the phase relationship. If the crystals 20 and 31 are positioned equidistant from the opening 24, these energies will be in such phase that the image cannot propagate down the guide 18 to the T. R. cavity, but can only propagate down the guide 23 to the pad 27 where it is absorbed and lost. However, if, as shown in Figs. 1 and 2, the crystal 31 is positioned further from the opening 24 than the crystal 18 by a distance equal to one-quarter of a wave length of the image frequency or an integral odd multiple thereof, the phases of these energies will be such that the image frequency will not be propagated back to the local oscillator but will be propagated back to the T. R. cavity 17, as shown by the solid arrow 43. As this cavity is parallel-resonant at the signal frequency, it will present substantially a short circuit at the image energy and reflect this energy back to the crystals 20 and 31, as shown by the dotted arrow 44. Furthermore, if the distance L from the T. R. cavity 17 to the crystal 20 is made such as to cause the cavity to present substantially an open circuit at the frequency of the reflected image energy at the plane of the crystal, the image energy will be reconverted to the intermediate frequency and develop a signal across the crystals 20 and 31 and thus not be wasted, resulting in a considerable increase in the sensitivity of the system.

The invention has been described as used in a radar system; however, it can also be used in radio communications equipment.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

Apparatus for mixing two periodic waves of different frequencies comprising two sections of wave guide having a common wall with an opening in said wall, means including a resonant cavity to propagate a first of said waves in a first of said wave guides, means to propagate a second of said waves in a second of said wave guides, a nonlinear impedance mounted in a transverse plane in each of said wave guides, and means coupled to each of said nonlinear impedances for deriving therefrom an output wave at a third frequency, the nonlinear impedance in the first wave guide being positioned at such a distance from the resonant cavity at the input end that said cavity appears as substantially an open circuit to energy at the image frequency with the result that said energy is reflected back toward said non-linear impedances where it combines with energy at the second frequency to produe energy at the third frequency, the plane of the second impedance being located at a distance from the plane of the first equal to approximately a quarter of a guide wave length at the image frequency.

References Cited in the file of this patent

UNITED STATES PATENTS

| | | |
|---|---|---|
| 2,433,387 | Mumford | Dec. 30, 1947 |
| 2,472,196 | Cork | June 7, 1949 |
| 2,568,090 | Riblet | Sept. 18, 1951 |
| 2,605,400 | McClain | July 29, 1952 |
| 2,637,813 | Braden | May 5, 1953 |
| 2,679,585 | Drazy | May 25, 1954 |

OTHER REFERENCES

Microwave Mixers, by Pound, volume 16 of Radiation Lab. Series, McGraw-Hill, 1948, pages 277, 278 and 279 cited.